Figures 1, 2A, 2B:
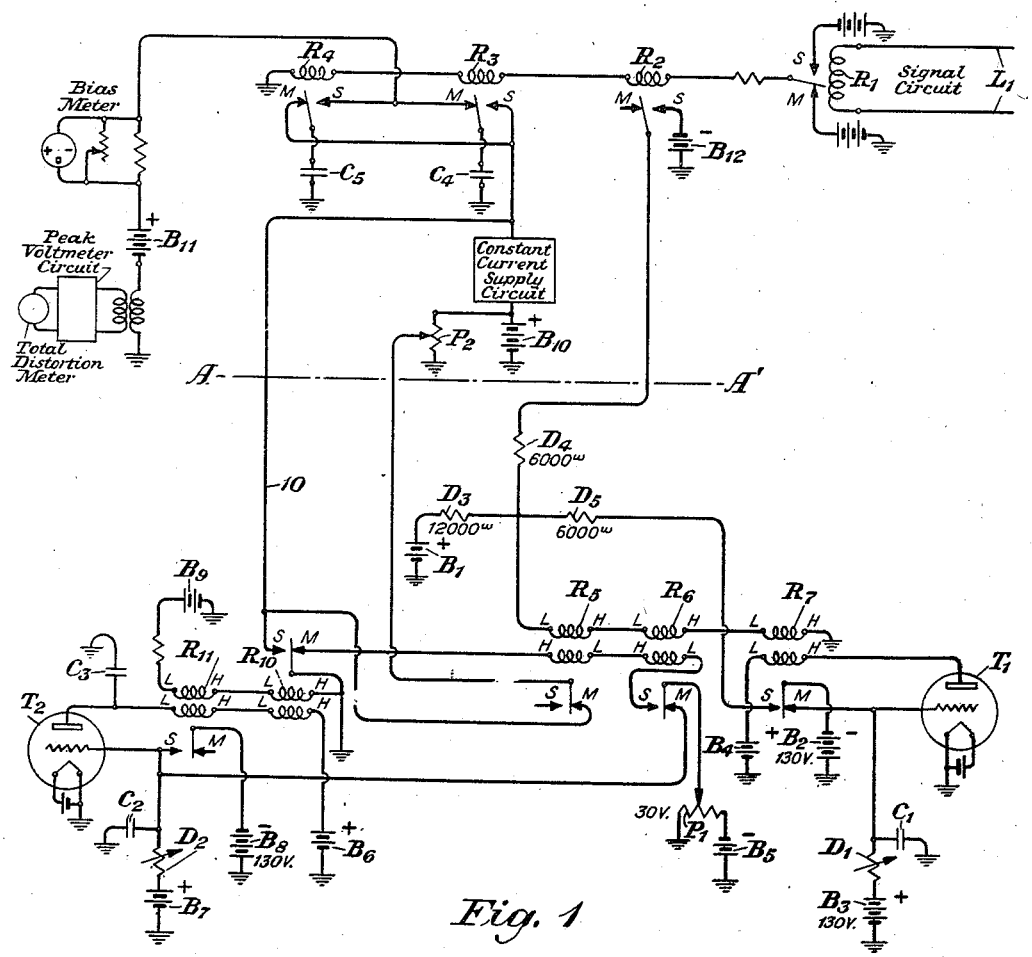

Jan. 12, 1943.   W. B. MARTIN   2,307,842

TELETYPEWRITER SYSTEM

Filed Sept. 17, 1941

INVENTOR
W. B. Martin
BY
ATTORNEY

Patented Jan. 12, 1943

2,307,842

UNITED STATES PATENT OFFICE 2,307,842

TELETYPEWRITER SYSTEM

Wade B. Martin, Westwood, N. J., assignor to American Telephone and Telegraph Company, a corporation of New York Application September 17, 1941, Serial No. 411,095

4 Claims. (Cl. 178—69)

This invention relates to circuit controlling devices and particularly to an arrangement employing vacuum tubes and timing circuits for controlling the operation of a device for measuring the distortion of telegraph signals.

In the measurement of distortion of telegraph signals, particularly those employed in teletypewriter transmission, it is customary to employ a device having condensers that may be charged by a source of current, the magnitude of the charge depending upon the time during which the source is connected to the condenser. The duration of that connection depends upon the length of the signal impulse to be measured. By measuring the magnitude of the charge by suitable apparatus the length of the signal impulse may thereby be determined. Such a measuring device is shown in the patent to F. A. Cowan, No. 2,132,678, dated October 11, 1938. In the arrangement therein shown, a start-stop distributor of a mechanical type is provided to establish reference points for commencing the charge on the comparison condensers.

The present invention resides in an arrangement of vacuum tubes, timing circuits, and relays which together serve to perform the functions of the mechanical distributor shown in the aforesaid patent.

This invention will be fully understood from the following description, when read in connection with the attached drawing, of which Figure 1 shows schematically a form of embodiment of the invention; and Figs. 2a and 2b are graphs that serve to illustrate the description of the invention.

In Fig. 1, $L_1$ represents a signal circuit over which teletypewriter signals are being transmitted to the measuring apparatus shown in the figure. The armature of the receiving relay $R_1$ is connected to the windings of relays $R_2$, $R_3$ and $R_4$ so that the armatures of the latter relays will follow the movements of the armature of relay $R_1$. The armature of relay $R_2$ is connected to the distributor circuit, the connection including resistance $D_4$ and the upper windings of relays $R_5$, $R_6$ and $R_7$. Also connected to these windings is the battery $B_1$ through the resistance $D_3$. The armature of relay $R_7$ is connected to the negative battery $B_2$, which, when the armature is upon its marking contact, as shown in the figure, applies 130 volts to the grid of the vacuum tube $T_1$ and also to the condenser $C_1$, which condenser, together with the resistance $D_1$ and the positive battery $B_3$, form a timing circuit for the tube $T_1$. Connected to the plate of that tube is a positive battery $B_4$, the connection including the lower winding of relay $R_7$.

The potentiometer $P_1$ is connected to the armature of relay $R_6$ and, when the armature is in the position shown in the figure, a potential which may be varied at will not normally approximates 30 volts negative will be applied to the grid of the vacuum tube $T_2$ and also to the condenser $C_2$, which condenser, together with resistance $D_2$ and the positive battery $B_7$ forms a timing circuit for the tube $T_2$. Positive battery $B_6$ is connected through the lower windings of relays $R_{10}$ and $R_{11}$ to the plate of tube $T_2$. Positive battery $B_9$ is connected to the upper windings of relays $R_{10}$ and $R_{11}$ and negative battery $B_7$, preferably of 130 volts, is connected to the armature of relay $R_{11}$.

The armatures of relays $R_3$ and $R_4$ are connected to the condensers $C_4$ and $C_5$, respectively, which condensers receive a charge that is proportional to the length of the received spacing and marking impulses, respectively. That charge is supplied by the constant current supply circuit shown upon the drawing. A potentiometer $P_2$, which is connected to the armature of relay $R_5$, serves to apply a unit charge to one of the condensers whenever the first transition occurs in the received telegraph signals. The inner contacts of relays $R_3$ and $R_4$ are connected to a circuit that includes the bias meter and also the peak voltmeter circuit. That connection also includes the battery $B_{11}$, the function of which will be later described. All the apparatus above the dot and dash line A—A' is disclosed in the aforesaid patent to Cowan and per se forms no part of the present invention.

The manner in which the distributor functions in connection with the measuring circuit is as follows: Let it be assumed that the teletypewriter distributor at the distant end of $L_1$ is upon its stop position and that it is about to send the signal represented by Fig. 2a, which, after the stop impulse comprises a start impulse and five character impulses. The total time for the transmission of seven impulses is one-sixth of a second. With the distant distributor in its stop position the armature of relays $R_1$ to $R_4$, inclusive, will be upon their marking contacts. Since the marking contact of relay $R_2$ is open the circuit connected to its armature will be under control of the positive battery $B_1$. The windings of all of the relays are so arranged that the armatures will be upon or moved to the marking contact when the positive battery is connected to a lower numbered terminal of the relay; and will remain or be moved to the spacing contacts when a negative battery is connected to the lower numbered terminal of the relay windings. For the sake of brevity, the lower and higher numbered terminals have been designated by the letters L and H, respectively, upon the drawing. Since the positive battery $B_1$ is connected to the L terminal of relays $R_5$, $R_6$ and $R_7$, their armatures will be held against their marking contacts. Considering relay $R_7$, the 130 volt negative battery $B_2$ will be connected to the grid of the tube $T_1$ and to the condenser $C_1$, which will take a charge proportional to that voltage. That negative charge is sufficient to prevent the passage of current from the plate to the filament of the tube $T_1$ and, therefore, no current flows through the lower winding of relay $R_7$. Referring to relay $R_6$, a negative potential of approximately 30 volts will be applied to the grid of tube $T_2$ and to the condenser $C_2$ associated therewith. That voltage is sufficient to prevent the flow of current from the plate to the filament of $T_2$ from the positive battery $B_6$. Accordingly, no current flows through the lower windings of relays $R_{10}$ and $R_{11}$. However, current flows from the positive battery $B_9$ through the upper windings of relays $R_{11}$ and $R_{10}$, and since its direction is from terminal L to terminal H the armatures remain on their marking contacts.

Referring to relay $R_5$, it will be seen that a circuit is established from the potentiometer $P_2$ through the marking contact of relay $R_5$ and over conductor 10 to condenser $C_5$. That condenser will thereupon take a charge, the magnitude of which is dependent upon the setting of the potentiometer $P_2$. That charge is of such magnitude that the voltage to ground of the condenser $C_5$ is equal to that of battery $B_{11}$ and since its polarity is such as to oppose that of the battery, no current will flow through the bias meter when the first mark to space transition described below occurs.

Let it be assumed that the distant distributor sends a starting impulse which produces the transition $a$—$b$ of Fig. $2a$. That transition causes the armatures of relays $R_1$ to $R_4$, inclusive, to move to their spacing contacts. At this time the condenser $C_5$ is disconnected from the potentiometer $P_2$ and connected to the battery $B_{11}$. When the armature of relay $R_2$ touches its spacing contact, the negative battery $B_{12}$ will be connected to the circuit that includes the upper windings of relays $R_5$, $R_6$ and $R_7$. The resistances of that circuit are so proportioned that there will be a reversal of current through those windings and the armatures of those relays will move to their spacing position. The movement of the armature of relay $R_7$ to its spacing position will connect the battery $B_2$ to the windings of relays $R_5$, $R_6$ and $R_7$ and that action will therefore lock those relays to their spacing position until the subsequent operation of the vacuum tube $T_1$. That operation will take place after the charge upon the condenser $C_1$ has fallen to a predetermined value, which will occur approximately in one-sixth of a second. The operation of relay $R_6$ to its spacing position removes the negative voltage from the grid of tube $T_2$ and the condenser $C_2$.

Condenser $C_2$ and resistance $D_2$ in connection with battery $B_7$ are proportioned so that the $T_2$—$R_{11}$ circuit will operate at 22 millisecond intervals after the first mark to space transition, following the disconnection of the potentiometer $P_1$ from condenser $C_2$. Potentiometer $P_1$ is variable to permit the advancement or retardation of the first operation of $T_2$ and the consequent M to S transition of $R_{10}$ and $R_{11}$. It must be remembered that the transmission measuring set measures from the optimum middle of each pulse to the next actual transition. A means must be provided to start the pulsing of relays $R_{10}$ and $R_{11}$ in the optimum middle of each received pulse.

The operation of relay $R_5$ opens the circuit from the potentiometer $P_2$ to the comparison condensers $C_4$ and $C_5$ and permits those condensers to take charges that are proportional to the duration of the received signal impulses. Considering relay $R_{10}$, it will be seen that condenser $C_4$ will be grounded and discharged. Considering relay $R_{11}$, it will be seen that the 130 volt negative battery $B_8$ will be connected to the grid and condenser $C_2$. As shown in Fig. $2b$, that action occurs 11 milliseconds after the occurrence of the transition $a$—$b$ representing the beginning of the start impulse. As soon as condenser $C_2$ is charged by the battery $B_8$, current will cease to flow through the tube $T_2$ and relays $R_{10}$ and $R_{11}$ will thereupon be controlled by the positive battery $B_9$, which results in the movement of their armatures to their marking contacts. The movement of the armature of relay $R_{10}$ from its spacing contact disconnects the ground from the condensers and permits condenser $C_4$ to take a charge from the constant current supply circuit, and if there were no transition from space to mark it would continue to receive a charge until relay $R_{10}$ operated again and grounded the condenser, which would occur as shown in Fig. $2b$, in 22 ms. Since there is a transition as represented by $c$—$d$ in Fig. $2a$, the charge that the condenser will take depends upon the time interval between the removal of armature of relay $R_{10}$ from its spacing contact and the movement of the armature of relay $R_3$ from its spacing contact, corresponding to the transition $c$—$d$. If there has been no distortion, that is, no shortening or lengthening of the received signal impulse, the voltage to ground on condenser $C_5$ will exactly equal the voltage of the battery $B_{11}$, which condition is indicated by the bias meter.

Since the charge given to the condenser $C_2$ by the negative battery $B_8$ will be dissipated in 22 ms. After relay $R_{11}$ has left its marking contact, there will then occur another flow of current from the battery $B_6$ through the lower windings of relays $R_{10}$ and $R_{11}$ and through the tube $T_2$ to ground. This will cause relays $R_{10}$ and $R_{11}$ to operate. Relay $R_{10}$ will ground condenser $C_5$ and dissipate the charge thereon. Relay $R_{11}$ will apply 130 volts negative to the grid of $T_2$ and to condenser $C_2$, thereby stopping the flow of current through the lower windings of relays $R_{10}$ and $R_{11}$. Those relays will then be controlled by current from the battery $B_9$, thereby disconnecting the battery $B_8$ from the tube $T_2$ and also removing the ground from condenser $C_5$. That condenser will thereupon take a charge from the constant current supply circuit which will depend upon the length of the received marking impulses. The pulsing operation of the vacuum tube $T_2$, together with its associated timing circuit and the relays $R_{10}$ and $R_{11}$, will occur seven times during the time in which the vacuum tube $T_1$ remains locked, as it were, by the negative charge on the condenser $C_1$, which represents one-sixth of a second. Thereupon current will flow from the positive Battery $B_4$ through the lower winding of relay R7 and through the space between the plate and the filament of the tube T1 to ground. The magnitude of that current and its direction through that winding are such as to cause the armature of relay R7 to move to its marking contact. The removal of the armature of relay R7 from its spacing contact disconnected negative battery B2 from the upper windings of relays R5, R6 and R7 and permitted those relays to be controlled by the current from the batteries B1 and from the positioning of the armature of relay R2. If there were no distortion of the signaling impulses, the armature R2 should at that instant be upon its marking contact so that relays R5 to R7, inclusive, would be controlled solely by the battery B1. That being so, the armatures of all those relays would thereupon be moved to their marking contacts, thereby connecting the 30 volt negative potentiometer to the grid of the tube T2 and to the condenser C2, and through the armature of relay R5 connecting the potentiometer P2 to the condenser C6. The apparatus is now in its normal position, as shown in the figure, ready to measure the distortion of the impulses of the next teletypewriter signal. It will accordingly be seen that by means of the vacuum tubes, the timing circuits and the relays shown in the lower part of Fig. 1, the functions performed by the mechanical distributor, as shown in the aforesaid patent to Cowan, are carried out. The condenser C3, shown attached to the plate circuit of tube T2 is designed to hold the relays R10 and R11 to spacing for 5 milliseconds so as to provide ample time for the discharge of the condensers C4 and C5.

It is to be understood that although the pulse time assigned in this description is 22 ms., that time may be varied at will within wide practical limits. Furthermore, it should be understood that, while the character is described as being $\frac{1}{6}$ second long and allows 7 pulses to the character, both the speed and number of pulses to character may be varied widely without departing from the scope of the invention.

It is to be understood that the values assigned to the several parts of the apparatus employed in this invention represent desirable proportions, but are not to be construed as limitations upon the scope and magnitude of the invention.

While this invention has been disclosed as embodied in a particular form, it is capable of embodiment in other and different forms without departing from the spirit and the scope of the appended claims.

What is claimed is:

1. In a system for measuring the distortion of teletypewriter signals, the combination with a source of teletypewriter signals of a relay responsive to those signals, the armature of which is connected to a source of negative voltage, a vacuum tube having its grid connected to one contact of the said relay, the other contact of which is connected to a winding of the said relay, a timing circuit including a condenser and a resistance, also connected to the grid of the said tube and adapted to be charged by the said source of negative voltage when the said armature rests upon the contact connected to the said grid, and a source of positive voltage connected to the plate of the said tube, the connection including a second winding of the said relay.

2. A system for measuring the distortion of teletypewriter signals comprising a vacuum tube, a timing circuit comprising a condenser and a resistance, a relay having a source of negative potential connected with the armature thereof and normally connected through a contact of the said relay to the condenser of the timing circuit and also to the grid of the said vacuum tube, a source of potential connected to the plate of the said tube, the connection including a winding of the said second relay, a source of teletypewriter signals connected to a second winding of the said second relay and adapted to disconnect the said negative source of potential from the said condenser and grid of the said vacuum tube, thereby permitting the discharge of the said condenser and the passage of plate-filament current through the said vacuum tube as soon as the condenser discharges, which period of time is equal to the length of the teletypewriter signal to be measured.

3. In a system to measure the distortion of a teletypewriter signal, the combination with a source of such signals of a vacuum tube circuit having a timing circuit connected thereto to adapt it to permit the flow of plate current within a given length of time after the release of the timing circuit, a second vacuum tube circuit also having a timing circuit connected thereto adapted to permit the flow of plate current each time the voltage of the latter timing circuit falls below a prefixed value, a relay controlled by the space current of the said second vacuum tube circuit adapted to connect a source of negative voltage to the second timing circuit each time the space current begins to flow in the second vecuum tube, thereby causing a predetermined number of pulses of current to flow in the plate circuit until the charge upon the condenser in the first timing circuit falls to a predetermined value.

4. In a system for measuring the distortion of teletypewriter characters comprising a plurality of impulses, the combination with a source of such signals of means including a condenser to measure the distortion of the impulses of which such signal is composed, means to apply a charging voltage to the said condenser, means controlled by the signal impulse to terminate the charging of the condenser upon the termination of the said impulse and to connect the condenser to a measuring device, and means to discharge the said condenser upon the completion of the said measurement, the said system being further characterized by adjustable means to advance or retard the effect upon the condenser discharging means of the first mark to space transition to insure the grounding of the condenser at the optimum middle of each pulse.

WADE B. MARTIN.